3,533,168
METHOD OF PREVENTING THE CAKING OF FINELY DIVIDED SOLID MATERIALS DURING STORAGE

Ryuichi Aoki, Yukitomo Ono, and Takao Hokari, Yokohama, and Tohru Nishijima, Tokyo, Japan, assignors to Japan Gas-Chemical Company, Inc., and Mitsubishi Petrochemical Co. Ltd., both of Tokyo, Japan, both corporations of Japan
No Drawing. Filed Aug. 1, 1968, Ser. No. 749,307
Claims priority, application Japan, Aug. 4, 1967, 42/49,947
Int. Cl. F26b 3/00
U.S. Cl. 34—22                                                    7 Claims

ABSTRACT OF THE DISCLOSURE

A method of preventing the caking of finely divided solid material having a tendency to caking upon storage, which comprises continuously passing through the accumulated layer of said material during storage a nonreactive gas having a relative humidity not exceeding the critical humidity of said material, at a superficial linear velocity in a column of at least 0.005 centimeter per second.

---

This invention relates to a method of preventing the tendency to caking upon storage of finely divided solid materials which have such a tendency.

Materials such as urea, ammonia sulfate, ammonium nitrate, potassium chloride, ammonium chloride, complex fertilizers, melamine and hexamine are usually manufactured, stored, transported and sold in the form of such as finely divided particles or powders. These finely divided solid materials have an undesirable tendency to absorption of moisture and caking during their storage. Hence, it was the general practice to store these materials in a dry chamber, but this alone was not sufficient for preventing their caking. The incorporation of such additions as finely divided inorganic materials as diatomaceous earth, talc, gypsum and clay, electrolytes of high molecular weight, surfactants as sodium dodecylbenzenesulfonate and the higher aliphatic amine has also been proposed, but the resistant-to-caking effect obtained was not adequate and for obtaining practical results it was necessary to use these additives in considerably large quantities. As a consequence, either discoloration of the products occurs or their purity is reduced, and it was also a disadvantage from the standpoint of economy.

It was now found that this undesirable tendency to caking of finely divided solid materials upon storage could be prevented by continuously passing into the accumulated layers of said material a nonreactive gas having a relative humidity not exceeding the critical humidity of said material at a superficial linear velocity in a column of at least 0.005 cm. per second.

The products which can be prevented by means of the invention method of their tendency to caking upon storage include the dried particulate and powdered products of such, for example, as urea, ammonium sulfate, ammonium nitrate, potassium chloride, ammonium chloride, complex fertilizers, melamine and hexamine. And in this case these products can be of the size and moisture content of the order usually possessed by those which are commercially available. For example, in the case of urea, it can have a particle size of about 0.1 to 1.7 mm. and a moisture content of about 0.1 to 1%. On the other hand, in the case of potassium chloride, it can have a particle size of about 0.06 to 2 mm. and its moisture content can be about 0.1 to 0.8%. The nonreactive gas useable in the present invention include air, nitrogen, carbon dioxide and the like, but the use of air is most advantageous.

The nonreactive gas has a relative humidity which does not exceed the critical humidity of the material to be treated. The term "critical humidity," as used herein and in the appended claims, is a ratio of the water vapor pressure of a saturated aqueous solution of a substance at a given temperature to the saturated water vapor pressure of pure water at said temperature; i.e., it refers to the relative humidity of atmosphere which is in equilibrium with a saturated aqueous solution of the substance at a given temperature. The critical humidities (%) of typical materials having a tendency to caking are presented in Table I.

TABLE I

|  | Critical humidity (percent) at— | | | | |
|---|---|---|---|---|---|
|  | 10° C. | 15° C. | 20° C. | 25° C. | 30° C. |
| Urea | 81.8 | 79.9 | 80.0 | 75.8 | 72.5 |
| Ammonium nitrate | 75.3 | 69.8 | 66.9 | 62.7 | 59.4 |
| Ammonium chloride | 79.5 | 79.2 | 79.3 | 76.0 | 77.2 |
| Ammonium sulfate | 79.8 | 79.3 | 81.0 | 81.8 | 79.2 |
| Potassium chloride | 88.3 | 86.2 | 85.7 | 83.4 | 84.0 |

The passing through the accumulated layer of the material to be treated of a nonreactive gas having a relative humidity higher than the critical humidity must be avoided over a prolonged period of time, since the product will be caused to absorb moisture to even finally deliquesce the product. However, the use for a short period of time of an excessively moist gas is permissible, provided that a drier gas is used for the rest of the period. A surprising fact is that the caking of the material to be treated can be fully prevented even though the gas is excessively moist, though this is not to be desired since the product will be moistened. That the prevention of caking did not depend on the humidity of the gas used was unexpected.

The nonreactive gas must be passed through the accumulated layer of the material to be treated at a superficial linear velocity in a column of at least 0.005 centimeter per second. Just the mere storage of the material to be treated in a chamber filled with the dry gas cannot prevent the undesirable caking of the material. The gas is preferably flowed into the accumulated layer of the material to be treated in a uniformly dispersed fashion. A gas introduction port can be provided at the lower part of the bin, say, a silo, in which the material to be treated is contained and the gas can be blown in from this port and upwardly through the layer of the material. It is desirable to provide a gas distributor at the gas introduction port in this case. As the gas distributor, use can be made of either a gas-permeable foraminous plate or a combination of a canvas and a supporting member having a plurality of relatively large holes. In addition, the gas can be passed from the top of the bin containing the material to be treated downwardly through the layer thereof. In this case, if the upper part of the bin has a space not filled with the material to be treated, this space functions as a gas distributor.

When the temperature of the nonreactive gas used is relatively high, it is best to accelerate the rate of flow of the gas, but in most cases a superficial linear velocity in a column faster than 1.5 centimeters per second is not necessary.

While the temperature of the material to be treated is preferably low, it has been found that it is possible according to the invention method to prevent caking in the case of urea even if it is of a relatively high temperature such, for example, as 65° C.

The nonreactive gas need not necessarily be fresh. A used gas can be recycled and reused, this being frequently an advantage. When a gas is recycled and repeatedly passed through the accumulated layer of the material to be treated, the initial relative humidity of the gas used may exceed the critical humidity of the material to be treated. Since in this case the amount of the gas used is definite and moreover the total moisture present in the system is fixed, the relative humidity of the material gradually decreases as the cycling of the gas is repeated to finally equal the critical humidity of the material treated or become less. Hence, one mode of advantageously practicing the invention comprises accumulating in a confined space the finely divided solid material having a tendency to caking and continuously cycling through the accumulated layer thereof a nonreactive gas having a relative humidity not exceeding the critical humidity of said material in a definite amount and at a superficial linear velocity in a column of at least 0.005 centimeter per second.

According to the invention method, the finely divided solid materials having a tendency to caking can be safely stored while maintaining their initial flowability without caking. The finely divided solid materials which have been stored while practicing the invention method readily flows out from their storage bins, for example, by just opening the withdrawal port or by using a pneumatic conveyor.

The conjoint use of the invention method with the conventional caking inhibitor will be still more effective in preventing the caking phenomenon.

The invention method is not limited in its application to only those instances where the finely divided solid materials are to be stored at their place of manufacture or at other places but can also be applied effectively in transporting these materials.

EXAMPLE 1

(A) For conducting a caking test under pressure, an apparatus was used which consisted of a steel cylinder 100 mm. in length and having an inside diameter of 50 mm., a bottom plate having an air inlet in its middle, and a piston fitting the foregoing cylinder and equipped with an air vent. After disposing the foregoing cylinder perpendicularly atop the bottom plate, it was charged with 85 grams of granular urea (average particle diameter 1.1 mm.) having a moisture content of 0.54 weight percent. A pressure of 2.3 kg./cm.$^2$ was applied to granular urea in the cylinder by means of the piston, after which the whole assembly was placed in a chamber maintained at a temperature of $30°\pm1°$ C. and a relative humidity up to 5%. The specimen taken out from the cylinder 10 days later was caked and it was difficult to crush it by hand. The crushing strength of the cake was 0.20–0.22 kg./cm.$^2$.

The foregoing caking test under pressure was carried out on granular urea (average particle diameter 1.1 mm.) which was dried to an extreme degree and having a moisture content of 0.14 weight percent. After a period of 10 days, the specimen was caked and was difficult to crush by hand. The compressive strength was 0.15–0.17 kg./cm.$^2$.

The foregoing test was also carried out on a granular ammonium nitrate specimen (average particle size 1.2 mm.) of a moisture content 0.5 weight percent and a granular ammonium chloride specimen of a moisture content 0.2 weight percent. After a period of 10 days, both specimens were caked.

(B) The apparatus used in the hereinbefore described tests of (A) was employed, and the same specimens as used in (A) were each submitted to the test under identical conditions as indicated above, except that during the test air was flowed in from the air inlet of the bottom plate of the apparatus, passed through the compressed layer of the specimen and discharged from the air vent of the piston. The air used was predried with silica gel and had a relative humidity of about 20–30% and temperature 30° C. The air was passed through at a superficial linear velocity in a column of 0.25 centimeter per second.

The air passage treatment was carried out under pressure for 10 days. When the specimens were taken out after this period of time had elapsed, it was found that none of the specimens were caked at all and, the initial flowability being maintained, it was possible to cause the materials to flow out naturally when their containers were inclined.

EXAMPLE 2

(A) A silo for laboratory use having a total capacity of 265 liters and consisting of a cylinder 57 cm. in diameter and 90 cm. in height and a conical hopper of an inclined angle of 57 degrees joined therebelow, and equipped at its bottom with withdrawal port of 7 cm. in diameter was charged with 160 kg. of granular urea (average particle diameter about 1.1 mm.) dried to an extreme degree of a moisture content 0.14 weight percent. When left standing under ambient conditions for 12 days, the urea particles caked and they would not flow out naturally when the withdrawal port at the bottom of the silo was just opened. Their discharge was unsatisfactory even when the outer wall of the silo was hammered.

(B) An apparatus as used in (A) was charged with 160 kg. of granular urea (average particle diameter 1.1 mm.) of a moisture content 0.17 weight percent. While silica gel-dried room temperature air (relative humidity about 25–30%) was blown in from the bottom of the silo at a superficial linear velocity in a column of about 0.08 centimeter per second, passed through the urea layer and vented from the upper open end of the apparatus, the urea specimen was allowed to stand for 15 days. At the end of this period, the urea particles still maintained their initial flowability. Thus, they continually flowed out naturally when the withdrawal port of the silo was just opened.

EXAMPLE 3

The experiment of Example 2(B) was repeated except that the superficial linear velocity of the air flowing through was reduced to 0.01 centimeter per second. The urea particles maintained their flowability even after 13 days and flowed out naturally from the silo.

When the experiment of Example 2(B) was again repeated but this time the superficial linear velocity in a column was reduced to 0.003 centimeter per second, the urea caked and would not flow out naturally. When the outside wall of the hopper was hammered, the caked material adjacent the wall gradually crumbled and flowed out, but that at the interior maintained its caked state and would not flow out.

The experiment of Example 2(B) was repeated using the apparatus as used therein except that the conical hopper of the apparatus had an angle of inclination of 30 degrees instead of 57 degrees. At the end of a 15-day period, the urea specimen flowed out naturally from the silo.

The experiment of Example 2(B) was repeated except that air of 30° C. and 68% relative humidity was used instead of dried air. The urea specimen maintained a satisfactory flowability at the end of the 15-day period.

The experiment of Example 2(B) was repeated except that air was passed through for 4 days, following which the passage of air was interrupted for 40 hours and thereafter again resumed to allow the specimen to stand for a total of 15 days under ambient conditions. The state of flow of specimen from the withdrawal port of the silo at the end of this period was unsatisfactory.

EXAMPLE 4

In this example, a large silo of the following dimension was used.

Diameter—4.15 meters
Column height—1.8 meters
Overall height—5.0 meters
Angle of inclination of hopper—55 degrees
Total capacity—37 cubic meters
Withdrawal port at bottom of hopper—50 cm. x 50 cm.

The top of the silo was closed except for an opening of 30 cm. in diameter in the middle. Further, the hopper was provided with a nozzle at its lower part for blowing in air.

(A) The foregoing silo was charged with 22 tons of granular urea (average particle diameter 1.1 mm.) of a moisture content 0.3 weight percent and temperature 30° C. The urea caked after the passage of 7 days and would not flow out at all from the withdrawal port at the bottom of the silo when the port was just opened. When allowed to stand under identical conditions for 21 days, the caking of the urea was so pronounced that it could only be withdrawn from the silo by hammering the outside wall of the silo.

Twenty-two tons each of granular urea (average particle size 1.1 mm.) of a moisture content 0.6 weight percent and temperature 30° C. and granular urea (average particle diameter 1.1 mm.) of a moisture content 0.3% by weight and temperature 65° C. were charged to the foregoing silo and left standing for 7 days. In both cases, the urea caked and could not be made to flow out naturally from the withdrawal port at the bottom of the silo. Further, in both cases it was necessary to manually withdraw the urea from the top of the silo.

(B) Twenty-two tons each of the granular urea indicated in Table II were stored in the hereinbefore described silo for the periods indicated while blowing air therethrough in the meantime. The average particle diameter of the granular urea was about 1.1 mm. in all cases. The air used was predried with silica gel and had a relative humidity of about 25–30% and temperature 30° C. In all runs the urea still possessed perfect flowability after the indicated periods of time had elapsed and flowed out naturally when the withdrawal port at the bottom of the silo was just opened.

TABLE II

| | Urea | | |
|---|---|---|---|
| Temperature (° C.) | Moisture content (wt. percent) | Superficial linear velocity of air (cm./sec.) | Period (days) |
| 45 | 0.6 | 0.2 | 21 |
| 45 | 0.6 | 0.1 | 7 |
| 65 | 1.0 | 0.4 | 7 |
| 65 | 0.3 | 0.2 | 7 |
| 65 | 0.3 | 0.03 | 7 |
| 35 | 0.45 | 0.4 | 7 |

In this case, pressures at optional portions on a horizontal plane 4 meters above the air-introduction port at the bottom of the silo were measured. It was found that the pressures were the same at all the portions, and the loss of pressure from the air-introduction port was 25 mm. $H_2O$.

EXAMPLE 5

The large silo used in Example 4 was charged with 22 tons of granular urea (average particle size 1.1 mm.) of a moisture content 0.6 weight percent and temperature 65° C., following which the air in the silo was circulated by withdrawing the air from the upper part of the silo and blowing this air into the accumulated layer of urea from a nozzle at the lower part of the silo. The superficial linear velocity in a column of the air stream was 0.4 centimeter per second. Even after the passage of 7 days, the granular urea maintained its initial flowability and all of it flowed out naturally from the silo by the mere opening of the withdrawal port at the bottom of the silo.

EXAMPLE 6

In this example, the apparatus used in Example 1 was used and a similar test was carried out on powdered hexamine (moisture content 0.5 weight percent, average particle diameter 0.16 mm.) and melamine (moisture content 0.04 weight percent, average particle diameter 0.06 mm.).

(A) 130 grams of each of the specimens to be tested were charged to the cylinder of the respective apparatus and the assemblies were left standing in a chamber maintained at a temperature of 28–30° C. and relative humidity 45–50%. In the case of hexamine, a pressure of 0.1 kg./cm.$^2$ was applied by means of the piston, whereas no pressure was applied in the case of melamine. The specimens removed from the cylinders after a period of 10 days had passed were in both cases caked to a single cylindrical form. Pressures of 0.2 kg./cm.$^2$ and 0.4 kg./cm.$^2$ were respectively required for breaching the cakes.

(B) The experiment was repeated except that in each of the cases it was carried out while blowing in air of temperature 30° C. and relative humidity 30% from the bottom of the apparatus. The specimens were removed from the cylinders after a period of 10 days. The hexamine could just barely be removed in a crumbly cylindrical form but was broken upon slight contact. On the other hand, the melamine retained its initial flowability and thus could not be removed in any single definite shape.

We claim:

1. A method of preventing the caking of a finely divided water-soluble solid chemical having a tendency to cake upon storage in the presence of water or water vapor, which comprises continuously passing through an accumulated layer of said chemical during storage a nonreactive gas having a relative humidity not exceeding the critical humidity of said chemical, at a superficial linear velocity in a column of at least 0.005 centimeter per second.

2. The method of claim 1 wherein said nonreactive gas is air.

3. A method of preventing the caking of a finely divided water-soluble solid chemical having a tendency to cake upon storage in the presence of water or water vapor, which comprises continuously passing through an accumulated layer of said chemical during storage, air having a relative humidity not exceeding the critical humidity of said chemical, at a superficial linear velocity in a column of 0.01 to 1.5 centimeters per second.

4. The method of claim 3 wherein said finely divided water-soluble solid is granular urea having an average particle diameter not exceeding about 1.7 mm.

5. A method of preventing the caking of a finely divided water-soluble chemical having a tendency to cake upon storage in the presence of water or water vapor, which comprises accumulating said chemical in a confined space and continuously cycling through a layer of said accumulated chemical air having a relative humidity not exceeding the critical humidity of said chemical at a superficial linear velocity in a column of at least 0.005 centimeter per second.

6. The method of claim 3 wherein said chemical is accumulated in a confined space and the air is continuously circulated therethrough.

7. The method of claim 5 wherein said chemical is granular urea.

References Cited

UNITED STATES PATENTS

| 184,162 | 11/1876 | Lissagaray | 34—37 |
| 2,689,973 | 9/1954 | Lee et al. | 34—10 X |
| 3,031,381 | 4/1962 | Langerhans | 34—36 X |
| 3,264,118 | 8/1966 | Kilcrease et al. | 34—50 |
| 3,380,174 | 4/1968 | McClaren | 34—50 X |
| 3,417,978 | 12/1968 | Suzukawa et al. | 34—10 X |

ROBERT A. O'LEARY, Primary Examiner

C. SUKALO, Assistant Examiner

U.S. Cl. X.R.

34—50